United States Patent
Polidor et al.

(10) Patent No.: US 10,579,890 B2
(45) Date of Patent: Mar. 3, 2020

(54) AUTOMATIC ALIGNMENT OF A 3D MODEL TO A TEST OBJECT

(71) Applicant: QUALITY VISION INTERNATIONAL INC., Rochester, NY (US)

(72) Inventors: Edward T. Polidor, Webster, NY (US); Attila Prokai, Budaörs (HU)

(73) Assignee: QUALITY VISION INTERNATIONAL INC., Rochester, NY (US)

( * ) Notice: Subject to any disclaimer, the term of this patent is extended or adjusted under 35 U.S.C. 154(b) by 12 days.

(21) Appl. No.: 15/890,488

(22) Filed: Feb. 7, 2018

(65) Prior Publication Data

US 2018/0247147 A1   Aug. 30, 2018

Related U.S. Application Data

(60) Provisional application No. 62/464,620, filed on Feb. 28, 2017.

(51) Int. Cl.
*G06K 9/32* (2006.01)
*G06K 9/46* (2006.01)
(Continued)

(52) U.S. Cl.
CPC ............ *G06K 9/3216* (2013.01); *G01B 11/24* (2013.01); *G06K 9/00214* (2013.01);
(Continued)

(58) Field of Classification Search
CPC ............. G06K 9/00208; G06K 9/6255; G01B 11/022; G01N 21/9515; G01N 21/952;
(Continued)

(56) References Cited

U.S. PATENT DOCUMENTS 6,064,759 A * 5/2000 Buckley ............... G01B 11/024
348/125
8,248,417 B1   8/2012 Clifton
(Continued)

OTHER PUBLICATIONS

International Search Report and Written Opinion for corresponding International Application No. PCT/US18/17191 dated Jun. 14, 2018 (19 pages).
(Continued)

*Primary Examiner* — Nathnael Aynalem
(74) *Attorney, Agent, or Firm* — Jodi A. Reynolds, Esq.; Thomas B. Ryan; Harter Secrest & Emery LLP

(57) ABSTRACT

A method of aligning a 3D CAD model to a test object in a machine vision system comprising steps of orienting the 3D CAD model in a model window, placing the test object on a motion stage in an orientation approximately matching the orientation of the 3D model, taking a video image of the test object with the video camera and extracting a peripheral boundary in a datum plane normal to the viewing axis of the video camera, extracting a silhouette boundary of the 3D model in a corresponding datum plane, relatively positioning the silhouette boundary of the 3D model to match the peripheral boundary of the test object using a fitting algorithm, and matching coordinates of points in the 3D model to coordinates of corresponding points of the test object referenced within the corresponding datum plane and along the viewing axis.

17 Claims, 7 Drawing Sheets

(51) Int. Cl.
*H04N 5/232* (2006.01)
*G06K 9/00* (2006.01)
*G01B 11/24* (2006.01)
*H04N 5/225* (2006.01)

(52) U.S. Cl.
CPC ......... *G06K 9/4609* (2013.01); *H04N 5/2256* (2013.01); *H04N 5/23212* (2013.01); *H04N 5/23296* (2013.01)

(58) Field of Classification Search
CPC ......... G06T 15/20; G06T 7/001; G06T 7/251; G06T 7/33; G06T 7/75
USPC .................................. 382/154, 85; 348/135
See application file for complete search history.

(56) References Cited

U.S. PATENT DOCUMENTS

| | | | |
|---|---|---|---|
| 9,341,465 B2 | 5/2016 | Kawa | |
| 9,489,765 B2 | 11/2016 | Siddiqui | |
| 2003/0144765 A1* | 7/2003 | Habibi | B25J 9/1697 |
| | | | 700/259 |
| 2004/0223053 A1* | 11/2004 | Gladnick | G01N 21/8806 |
| | | | 348/79 |
| 2005/0031191 A1* | 2/2005 | Venkatachalam | G06K 9/4633 |
| | | | 382/152 |
| 2005/0213807 A1* | 9/2005 | Wasserman | G06T 7/0004 |
| | | | 382/152 |
| 2006/0133663 A1* | 6/2006 | Delaney | G06T 7/0004 |
| | | | 382/152 |
| 2006/0140473 A1 | 6/2006 | Brooksby et al. | |
| 2007/0014467 A1* | 1/2007 | Bryll | G06K 9/4609 |
| | | | 382/152 |
| 2008/0292180 A1* | 11/2008 | Kobayashi | G06K 9/209 |
| | | | 382/154 |
| 2009/0088999 A1* | 4/2009 | Bryll | G01B 11/0608 |
| | | | 702/86 |
| 2010/0316280 A1* | 12/2010 | Lancaster | G06K 9/00214 |
| | | | 382/154 |
| 2012/0076355 A1* | 3/2012 | Yoon | G06T 7/251 |
| | | | 382/103 |
| 2012/0069017 A1 | 5/2012 | Zheng et al. | |
| 2017/0358048 A1* | 12/2017 | Kotake | G06T 1/0007 |

OTHER PUBLICATIONS

Qin Z et al: "Extracting 2D Projection Contour from 3D Model Using Ring-Relationship-Based Method," Information Technology Journal 6(6): pp. 914-918, 2007, Xi'an, China.

Freudenberg B et al: "A Developers Guide to Silhouette Algorithims for Polygonal Models," IEEE Computer Graphics and Applications, IEEE Service Center, New York, NY, US, vol. 23, No. 4, Jul. 1, 2003.

Gooch, Bruce: "Silhouette Extraction," SIGGRAPH, Jul. 31, 2003. Retrieved from the Internet on Jun. 29, 2018: http://citeseerx.ist.psu.edu/viewdoc/download?doi=10.1.1.83.2181&rep=rep1&type=pdf.

* cited by examiner

AUTOMATIC ALIGNMENT OF A 3D MODEL TO A TEST OBJECT

BACKGROUND OF THE INVENTION

Field of the Invention

The invention relates to the field of machine vision system technology, and even more particular to automated alignment of a 3D CAD model to a test object for measuring a feature of the test object.

Description of Related Art

Machine vision systems project images of test objects disposed on a stage onto display screens. Many current vision measuring machines rely on a video image of the part being measured to allow the user to select the measurements to be made. As the user moves from one position on the measured part to another, an adjustment of lighting and focus is often required to keep the image quality useful for selecting additional features to be measured. Particularly for parts that have significant depth along the optical axis of the vision, changing the focus from measured point to measured point can become time consuming.

In the case where a CAD drawing is available for the part to be measured, some measuring software, such as QVI's Zone3, allow the user to indicate the measurements to be made in a model window of a display panel by loading a CAD model of the part to be measured into the controller and then aligning the CAD model with the video image through a series of guided, manual steps. This manual setup process takes time and can be confusing to an inexperienced user.

BRIEF SUMMARY OF THE INVENTION

A method of aligning a 3D CAD model to a test object in a machine vision system is provided. In one configuration, the method includes the steps of orienting the 3D CAD model in a model window of the machine vision system for exposing features of the master object that correspond to features of the test object intended for measurement, placing the test object on a motion stage of the machine vision system in an orientation approximately matching the orientation of the 3D CAD model, taking an image of the test object on the motion stage with the camera and extracting a peripheral boundary in a datum plane normal to the viewing axis of the camera, extracting a silhouette boundary of the 3D CAD model in a corresponding datum plane, relatively positioning the silhouette boundary of the 3D CAD model to match the peripheral boundary of the test object in the corresponding datum plane using a fitting algorithm, and matching coordinates of points in the 3D CAD model to coordinates of corresponding points of the test object referenced within the corresponding datum plane and along the viewing axis.

The method may further include the steps of collecting all the line segments from the possible silhouette edges of a 3D triangle mesh of the CAD model, projecting the possible silhouette line segments to 2D using the view direction of the camera, generating 2D candidate contour points on the line segments, generating test points each moveable from a first position matching one of the candidate contour points to a second shifted position, and determining if each test point in the shifted position is covered by neighboring surfaces of the 3D triangle mesh of the CAD model, wherein each 2D candidate contour point corresponding to the test points in a second shifted position not covered by any neighboring surfaces is a true contour point.

The method may further include the step of generating a minimum spanning tree having a set of edges on the test points covered by a neighboring surface in the second shifted position.

In a configuration, the method further comprises the step of discarding a subset of edges of the minimum spanning tree that are longer than a point generation density, wherein the remaining subset of edges of the minimum spanning tree are segments of a true contour line of the 3D CAD model.

The method may further comprise the step of using a fitting algorithm to fit the remaining subset of minimum spanning tree edges to the peripheral boundary of the test object.

In a configuration, the 3D CAD model includes lines connected by vertices and the step of extracting the silhouette boundary includes removing the lines that are interior to the boundary of the 3D CAD model in the corresponding datum plane.

The method may further comprise the step of selecting on the 3D CAD model a feature to be measured, automatically translating at least one of the motion stage and the camera to a desired position based on the matching coordinates of points in the 3D CAD model to coordinates of corresponding points of the test object referenced within the corresponding datum plane and along the viewing axis, and, measuring a test object feature corresponding to the selected feature of the CAD model.

In a configuration, the method may also include the step of selecting on the 3D CAD model a feature to be measured, and automatically focusing the camera with respect to the test object based on the coordinates of the one or more points of the selected feature of the 3D CAD model before measuring the selected feature on the test object.

In another configuration, the step of taking an image of the test object on the motion stage with the camera includes the step of using a video camera to provide one of: (i) still image data, and (ii) image data of a frame from a video stream.

The method may further comprise the step of backlighting the test object before taking the image of the test object on the motion stage with the camera.

The method may also comprise the steps of selecting on the 3D CAD model a feature to be measured, automatically translating at least one of the motion stage and the camera to a desired position based on the matching coordinates of points in the 3D CAD model to coordinates of corresponding points of the test object referenced within the corresponding datum plane and along the viewing axis, automatically focusing the camera, and measuring a test object feature corresponding to the selected feature of the CAD model.

In yet another configuration, the method of measuring different features of a test object with a machine vision system having reference to a 3D CAD model comprises the steps of taking a video image of the test object with a video camera, extracting a peripheral boundary of the imaged test object in a datum plane normal to a viewing axis of the video camera, relatively positioning a silhouette boundary of the 3D CAD model to match the peripheral boundary of the test object in a corresponding datum plane, matching coordinates of points in the 3D CAD model to coordinates of corresponding points of the test object referenced within the corresponding datum plane and along the viewing axis, selecting a feature of the CAD model within the model window and identifying coordinates of one or more points of the feature, and measuring a test object feature corresponding to the selected feature of the CAD model within the model window.

The method may further comprise the step of changing a focus of the video camera with respect to the test object based on the coordinates of the one or more points of the selected feature of the CAD model as referenced along the viewing axis before measuring the test object feature.

The method may also further comprise the step of changing lighting conditions of the test object based on the coordinates of the one or more points of the selected feature of the CAD model as referenced within the corresponding datum plane and along the viewing axis.

The method may also comprise the step of adjusting the field of view (FOV) of the video camera to allow for the features of the test object to be measured to be within the field of view (FOV). In one configuration, the field of view (FOV) of the video camera is automatically adjusted.

The method may further comprise the step of adjusting the depth of field (DOF) of the video camera to allow for an entire peripheral boundary of the test object to remain in focus, whether or not the peripheral boundary is near the datum plane. In one configuration, the depth of field (DOF) of the video camera is automatically adjusted.

In another configuration, a method of measuring different features of a test object with a machine vision system having reference to a 3D CAD model, comprises the steps of selecting on the 3D CAD model a feature to be measured, automatically translating at least one of the motion stage and the camera to a desired position based on the matching coordinates of points in the 3D CAD model to coordinates of corresponding points of the test object referenced within the corresponding datum plane and along the viewing axis, automatically focusing the camera, and measuring a test object feature corresponding to the selected feature of the CAD model.

BRIEF DESCRIPTION OF THE SEVERAL VIEWS OF THE DRAWING(S)

DETAILED DESCRIPTION OF THE INVENTION

Figure 1:
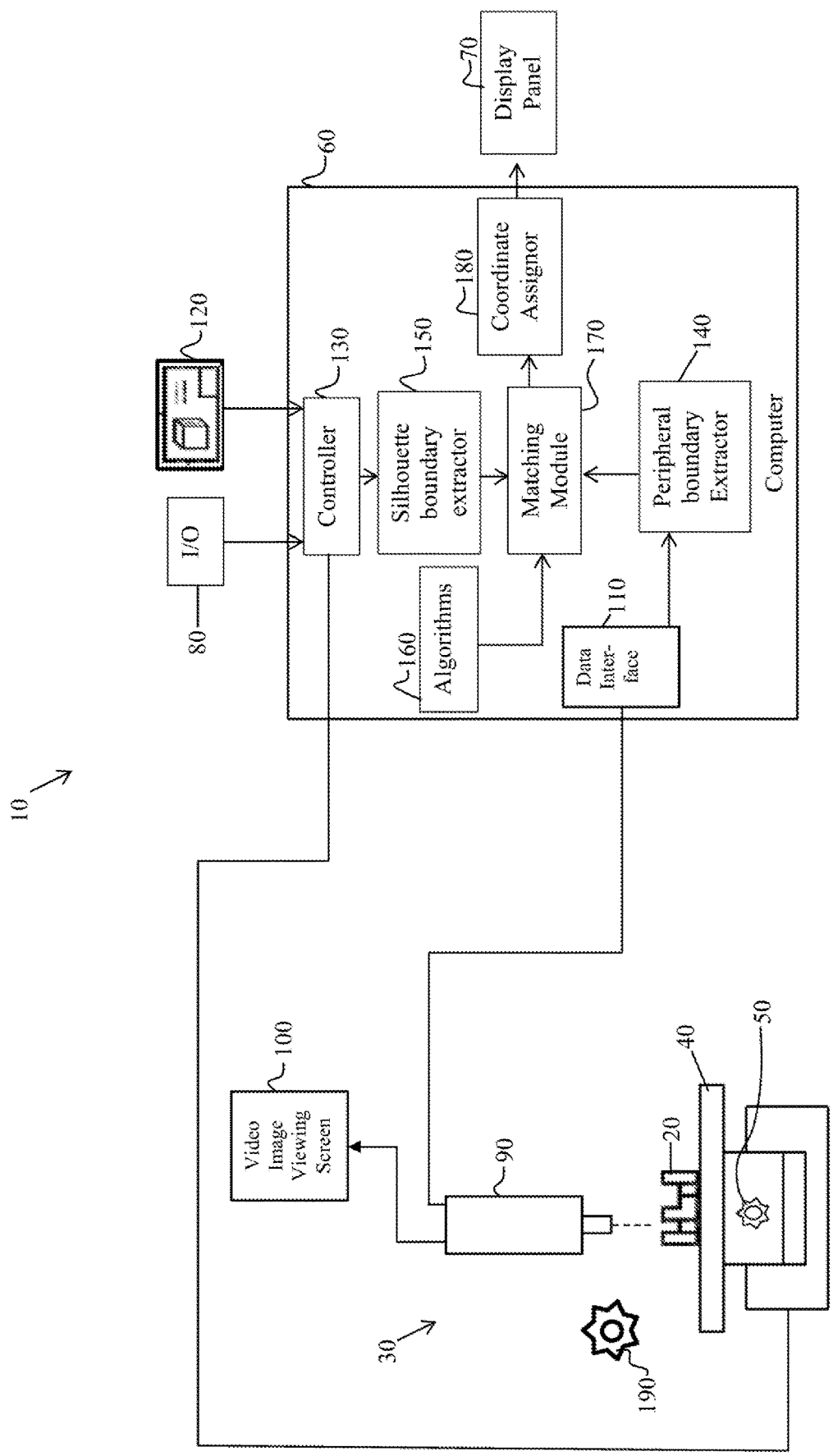
FIG. 1 is a perspective view of a schematic diagram showing an exemplary embodiment of the disclosed machine vision system for aligning a 3D CAD model to a test object.

Referring now to the figures, FIG. 1 is an exemplary embodiment of a machine vision system 10 used for generating a profile of the test object 20. In one configuration, the machine vision system 10 is a top-down optical system. The machine vision system 10 may be, in one configuration, a coordinate measuring machine. An exemplary coordinate measuring machine that may be used is the Smartscope Quest Series Model 650 CMM available from Optical Gaging Products, Inc. However, it should be appreciated by those having ordinary skill that other machine vision systems having measuring and video capabilities may be used.

The machine vision system 10 generally includes an optical imaging system 30, a moveable stage 40, and a backlight illuminator 50. The system 10 further includes a processing apparatus 60, such as a computer, containing, in a conventional manner, one or more processors, memories, database, graphics cards, etc. together with a display panel 70, such as a conventional personal computer monitor, and user input devices 80, such as a keyboard, mouse etc. The system may additionally include a printer and additional display panels (not shown). The processing apparatus 60 is programmed to operate in accordance with programming instructions input, for example, as data stored on a date storage medium and/or as a signal input to the processing apparatus 60.

The moveable stage 40 may include a multi-axis stage having three orthogonal axes X, Y, and Z of translation for positioning and moving the test object 20. However, it should be appreciated that the stage 40 could include fewer axes of translation or not be moveable at all. The stage 40 may be adjusted manually via manual controls or automatically via controller 130 and automatic positioners such as motors, actuators, or the like.

The machine vision system 10 may not have a moveable stage. The optical imaging system 30 may be moved along X, Y, and Z axes. In some configurations the moveable stage 40 is moved only along the Y axes and the optical imaging system 30 is moved along the X and Z axes. Some systems have a stage that is not moveable with an optical imaging system 30 that is moved along the Z axis; the user has to move the part along the X and Y axes manually. As long as the positions of the optical imaging system 30 and the moveable stage 40 are known, machine coordinates of a measured point, which define the location of a measurement point relative to the machine vision system 10, can be determined.

The optical imaging system 30 of the machine vision system 10 may include a video camera 90. The video camera 90 may project a video image of the test object 20 onto a viewing screen 100. It should be appreciated, however, that other devices may be used, including, but not limited to a still camera, a laser 3D scanner, or any device arranged to obtain image data of the test object 20 and send the image data to the machine vision system 10 via a test object data interface 110. It should be appreciated that in one configuration, the video camera 90 projects a video image of the test object 20 onto display panel 70 instead of, or in addition to, projecting the video image onto viewing screen 100. Preferably, the video camera 90 has a relatively large field of view (FOV). Having a large FOV can reduce the amount of time required to extract the test part 20 boundary. The video camera 90 also preferably has a relatively large depth of field (DOF). Thus, the entire boundary of the test part 20 is preferably in focus, including any features of the test part 20 that are not near the datum plane. In an exemplary embodiment, the optical configuration is 100 mm field of view with a useable depth of field of 75 mm.

In one configuration, the test object 20 is backlit by a backlight (profile) illuminator 50. The backlight illuminator 50 is a light source that outputs an illumination beam. The light source may be a light emitting diode (LED), incandescent bulb, or arc lamp, and optical components to shape the illumination beam, among other things. In one configuration, the stage 40 includes a detection area (not shown)

through which illumination light is transmitted to backlight the test object. For example, the detection area may include one or more openings, and/or a circular area made of transparent glass.

The test object 20 may be any workpiece, especially a workpiece having features a user desires to measure. Information for generating location information of some features on the test object 20 that requires measurement preferably arises from one or more digital machine readable files 120 containing design specifications of the test object 20. The digital machine readable file may be a 3D model of the test object generated by a computer-aided design (CAD) system. When used herein, "3D" is meant as three-dimensional and "2D" is meant as two-dimensional. The user obtains a pre-existing digital machine readable file of the test object 20 and loads it into the model window of the measuring software.

In a configuration, digital file 120 may include a 3D CAD model, which can be represented in various ways including wireframe, surface, or solid models with topology and feature descriptions intended for guiding the manufacture of the test object 20. Preferably, the wireframe polylines, or 3D boundary poly-line, of each surface in the 3D model is used, for example, .step files. However, it should be appreciated by those having ordinary skill that a wireframe is not required. Mesh only models, for example .stl files, may be used as well. Once the digital file 120 is loaded, the 3D model of the test object 20, sometimes referred to herein as the CAD model, is aligned by the user with a datum plane such that the features to be measured are shown when viewed from the top as discussed in more detail below. The datum plane is orthogonal to the optical axis of the video camera and parallel to the surface of the stage 40. Thus, the axis of the feature to be measured should be aligned approximately parallel with the optical axis. For example, if a user desires to measure the diameter and depth drilled normal to a surface of a test object 20, the user would align the 3D model such that the axis of the hole to be measured is approximately orthogonal to the datum plane and parallel to the optical axis. Similarly, the test object 20 is aligned such that it appears in the same approximate orientation. That is, the axis of a hole of the test object would be approximately parallel with the optical axis and the stage 40 and the datum plane would be orthogonal to the optical axis.

The control unit 130 is a controller that controls the display panel, the moveable stage 40, and the optical imaging system 30 of the machine vision system 10 and analyzes the video image of the test object 20. The user input/output devices 80 are also coupled to the control unit 130.

Figure 2:
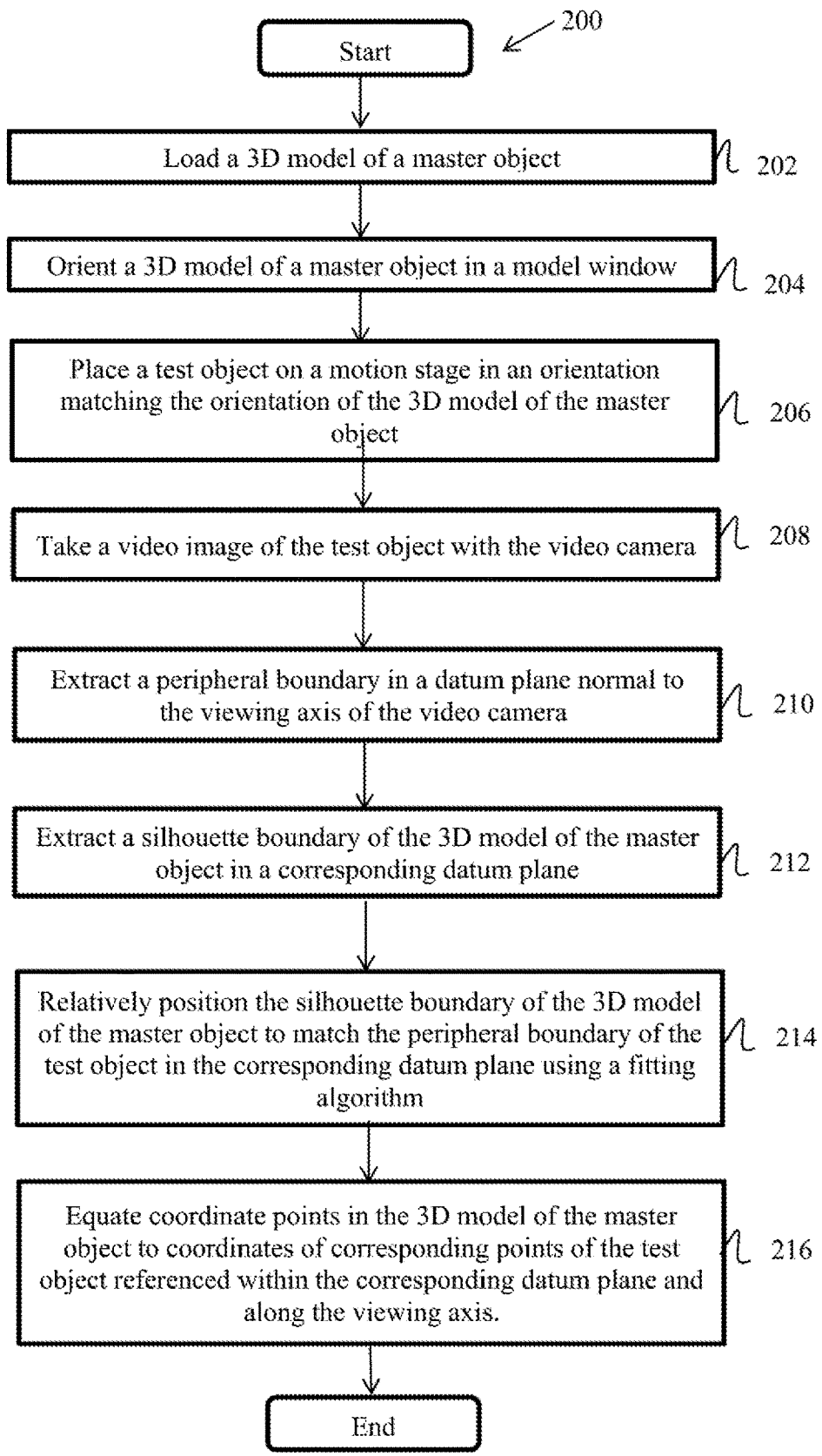
FIG. 2 is a flowchart disclosing the method steps of an embodiment for aligning a 3D CAD model to a test object in a machine vision system.

Referring now to FIGS. 1 and 2, FIG. 2 shows the process for automatically aligning a 3D CAD model to the video image of a test object and thus, to the test object 20 itself, according to certain embodiments. The process 200 may begin with the step of the user first loading a 3D model into the model window of the measuring software of the machine vision system 10 according to step 202. Next, the process includes orienting the 3D CAD model as set forth above and according to step 204. Certain features of the CAD model that correspond to features of the test object 20 intended for measurement will then be exposed. For example, the user may align the 3D model such that the axis of a feature to be measured is approximately orthogonal to the datum plane and parallel to the optical axis. It should be appreciated that a user need not know any numerical information regarding the features of the test part to be measured. The user will then place the test object 20 on the motion stage 40 of the machine visions system 10 in an orientation approximately matching the orientation of the 3D CAD model according to step 206. The motion stage 40 may be moved in any plane to align the angular orientation of the test part 20 to match the orientation of the 3D CAD model.

It should be appreciated by those having ordinary skill that alternatively, as a first step, a user may place the test object 20 on the motion stage 40 of the machine visions system 10 and then the user may orient the 3D CAD model in the model window in an orientation approximately matching the orientation of the test object 20. By "matching" it is meant that the 3D CAD model and the test object 20 are approximately in the same position in relation to the x-, y-, and z-axis, with the same object features exposed to the viewing axis. It should be appreciated, however, that the 3D CAD model and the test object 20 are not required to be oriented in an exact position.

Before the video image is taken, the video camera 90 is oriented to the test object 20 placed on the stage 40. The orientation of the video camera 90 is known by the machine vision system 10 and will be automatically input into the contours generation algorithm. The automatic contour measurement discussed below is difficult with front surface illumination, and less difficult with rear surface illumination. Thus, a backlight 50 positioned under the stage is used. The video camera 90, therefore, is ideally directed vertically above the test object 20. It should be appreciated by those having ordinary skill in the art that the test object 20 need not be centered under the video camera 90.

According to step 208, a video image of the test object 20 positioned on the motion stage 40 in a datum plane normal to the viewing axis of the video camera is taken with a video camera 90. In one configuration, the video image includes still image data. In another configuration, the video image is image data of a frame from a video stream. On command by the user, the peripheral boundary of the test object 20 is extracted via peripheral boundary extractor 140 according to step 210. That is, in one configuration, the system 10 uses the video image to measure the boundary of the test object 20 in 2D. The contour of the test object 20 is measured using software known in the art. The generated contour of the test object 20 is based on the user's approximate alignment of the test object 20 and the current orientation of the camera 90.

The process 200 also extracts a silhouette boundary of the 3D CAD model via silhouette boundary extractor 150 in a corresponding datum plane according to step 212, as described in more detail below. In a configuration, the 3D CAD model is compressed into 2D in the datum plane before the silhouette boundary is measured. The silhouette boundary of the 3D model may be presented to the user as a plan view. Using a fitting algorithm 160, the matching module 170 matches the silhouette boundary of the 3D CAD model to the peripheral boundary of the test object 20 in the corresponding datum plane. In one configuration, the well-known least squares algorithm is used according to step 214. The test object 20, the 3D CAD model, and machine x-, y-, and z-coordinates are linked together and assigned coordinates via coordinate assignor 180 in the same common 2D reference frame. The 2D datum plane from the 3D CAD model is assigned a location that is the same as the measuring machine's Z datum (Z=zero). Thus, according to step 216, coordinates of points in the 3D CAD model are matched to coordinates of the test object 20 referenced with the corresponding datum plane and along the viewing axis. It should be appreciated that the measured coordinates of the test object 20 may not perfectly match the nominal coordinates of the 3D CAD model. That is, the least squares fit may not provide perfect alignment. Rather, the measured coordinates of the test object 20 are approximately matched to the nominal coordinates. The user can then choose the points to be measured from the display panel 70 model. The video camera 90 can be quickly refocused to measure features with different z-coordinates because their approximate z-coordinates are known from the 3D model. In some configurations, the user is also not required to change the lighting for the test part 20 feature to be measured. This orientation process makes it possible to automatically move the machine visions system 10 to measure 3D features on the test part 20 simply by selecting the features from the 3D CAD model in the model window of the display panel 70.

Figure 4:
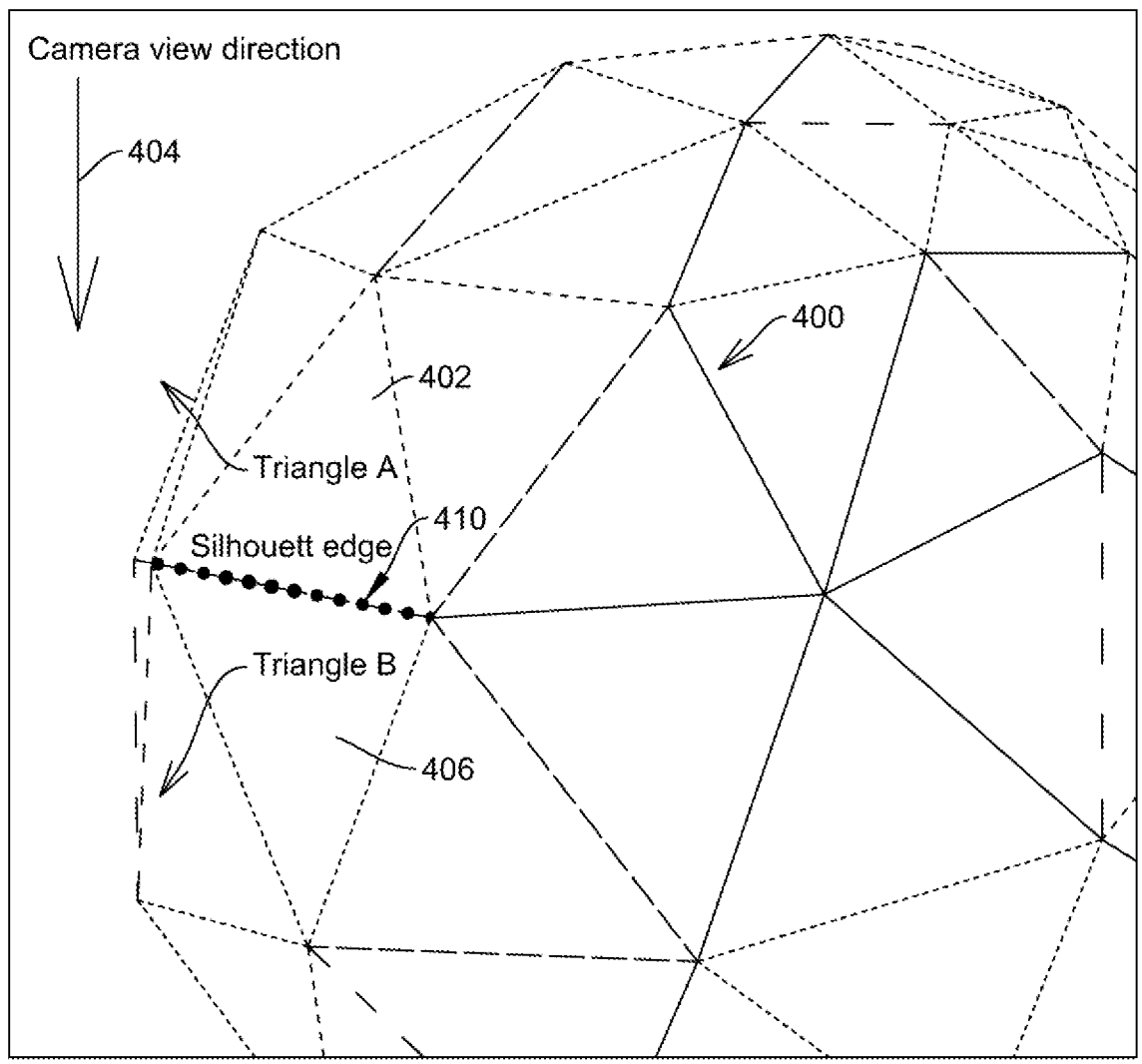
FIG. 4 is an exemplary triangle mesh of a 3D CAD model.

The generation of a virtual contour edge (also referred to herein as the silhouette edge) of the 3D CAD model is based on triangle neighborhood information on triangle edges. More specifically, a 3D boundary poly-line of each surface in the 3D model is collected, wherein each poly-line is a collection of vertices and the line segments between them. That is, all the line segments from the wireframe polylines are collected. Next, all the line segments from the silhouette edges of the 3D mesh are collected. In one configuration, the mesh of the CAD model is a triangle mesh 400 representing the surface of the CAD model, for example the CAD model bowl as shown in FIG. 4, wherein each triangle is a collection of three points and three line segments between them. The triangle neighborhood information on each triangle edge is used to recognize the possible silhouette edges. A triangle edge is a possible silhouette edge 410 if the following is true for the two neighboring triangles: (i) the normal vector of one of the neighboring triangles, Triangle A 402, points somewhat away from the camera view direction 404; and (ii) the normal vector of the other neighboring triangles, for example Triangle B 406, points somewhat in the same direction as the camera view direction 404. The candidate contour line segments are the 3D boundary polyline segments and the possible silhouette line segments projected (flattened) to 2D using the camera's view direction 404. Not all candidate contour line segments will be part of the contour. To determine whether or not the collected 2D candidate contour line segments are truly contour line segments 2D points are generated on the line segments with a given point generation density, then the 3D mesh triangles are projected to 2D using the given camera direction and position and the 2D points covered by any of the 2D triangles are filtered out. It should be appreciated that the distance between the 2D points generated on the line segments should be smaller than the size of the smallest feature on the 3D CAD model. The 2D point is considered "covered" by a 2D triangle if it is inside the 2D triangle area, leaving only a contour. That is, the points that are interior to the boundary of the 3D CAD model are removed.

Figure 5:
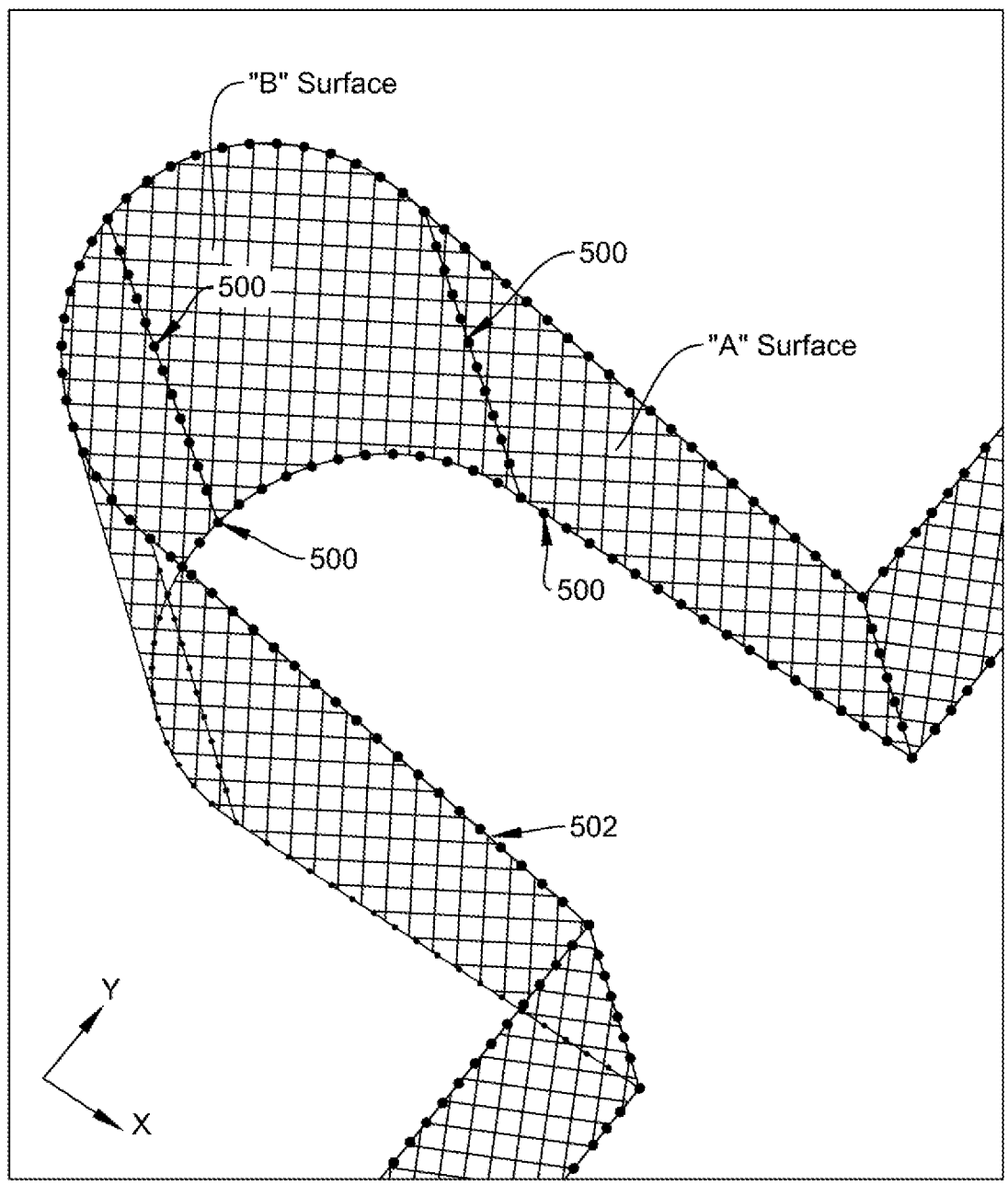
FIG. 5 is an exemplary set of candidate contour points.
Figure 6:
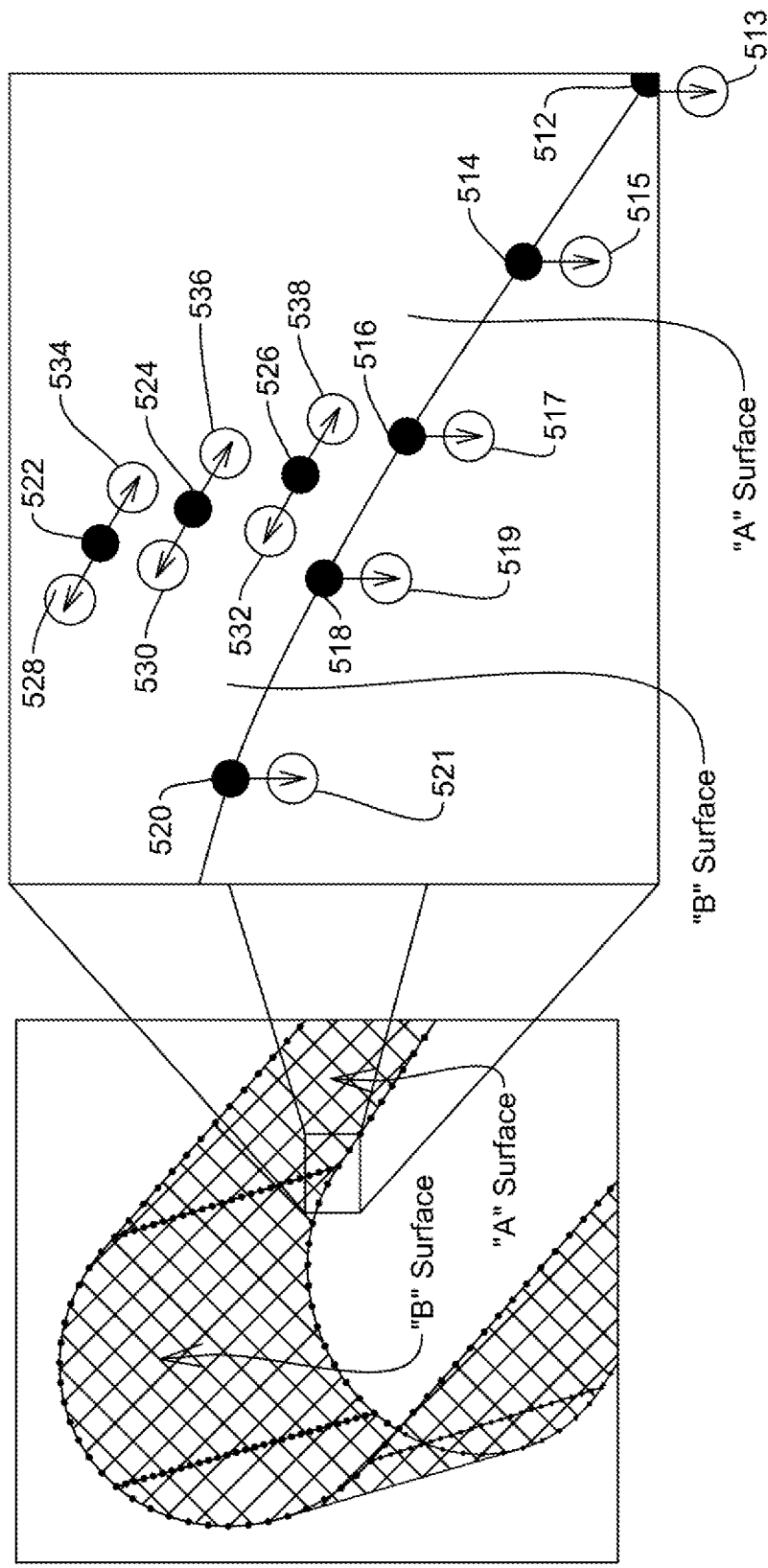
FIG. 6 is an exemplary set of test points used to determine whether a point is a true contour point.
Figure 7:
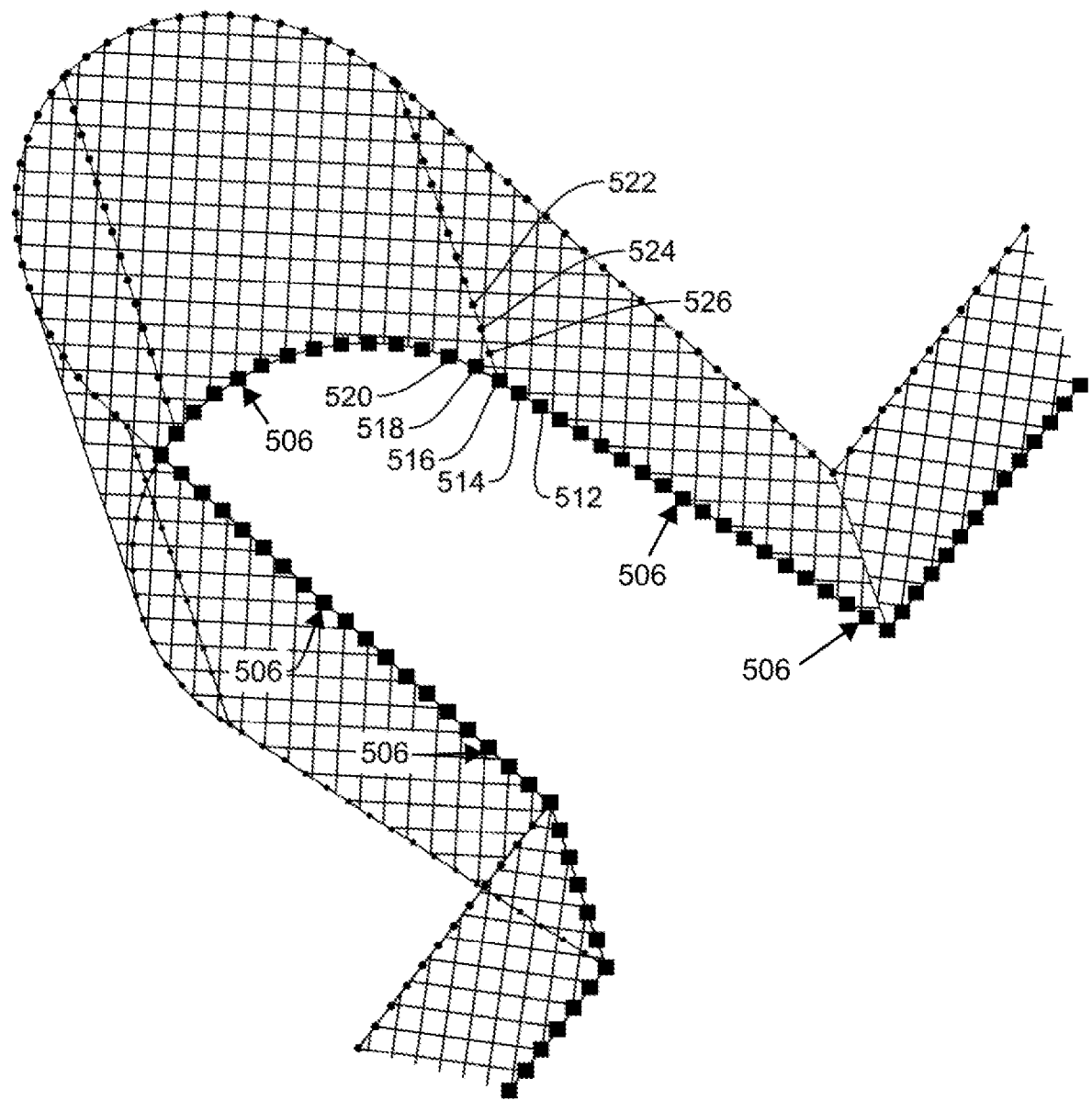
FIG. 7 is an exemplary set of true contour points.

More specifically, as shown in FIGS. 5-7, a set of 2D candidate contour points 500 are generated along line segments 502. At this point, it is difficult to determine which points were generated on a triangle edge and which points were generated inside the 2D triangle area. Thus, a shifting test, as shown in FIG. 6, can be used for each point 500. In one example, test points 512, 514, 516, 518, 520, 522, 524, 526 are generated from certain candidate points 500. The test points 512, 514, 516, 518, 520, 522, 524, 526 are shifted to determine whether or not the test points 512, 514, 516, 518, 520, 522, 524, 526, when shifted from the candidate point 500 position, cover any neighboring surfaces. For example when points 512, 514 on the edge of "A surface" are shifted down to locations 513, 515, respectively, the points 512, 514 are not covered by any neighboring surface; similarly when points 518, 520 on the edge of "B" surface are shifted down to locations 519, 521, respectively, the points 518, 520 are not covered by any neighboring surface. Thus, the 2D points 518, 520 are determined to be a "true" contour point. When points bordering "A" surface and "B" surface, 522, 524, 526 are shifted to locations 528, 530, 532, respectively, or to locations 534, 536, 538, respectively, they are covered by the "B" surface and "A" surface respectively. Since these 2D points, 522, 524, 526 are covered by a neighboring surface, 2D points 522, 523, and 526 are not considered "true" contour points. As shown in FIG. 7, shifted points that are not covered by any neighboring surfaces are shown as "true" contour points 506. When point 516 bordering "A" surface and "B" surface is shifted to location 517, the point 516 is not covered by any neighboring surface and therefore, this 2D point 516 is determined to be a "true" contour point.

A minimum spanning tree is generated on the remaining 2D points. The minimum spanning tree is a spanning tree having a sum of edge weights that is the smallest possible. The minimum spanning tree is built using any of several well-known minimum spanning tree algorithms (e.g., Prims, Kruskall, Boruvka) based on the remaining 2D points. The graph edges from the spanning tree that are longer than the point generation density are thrown out. The remaining graph edges are the segments of the true contour line of the 3D CAD model, which can be fitted, using the fitting algorithm 160 to the peripheral boundary of the test object 20.

Figure 3:
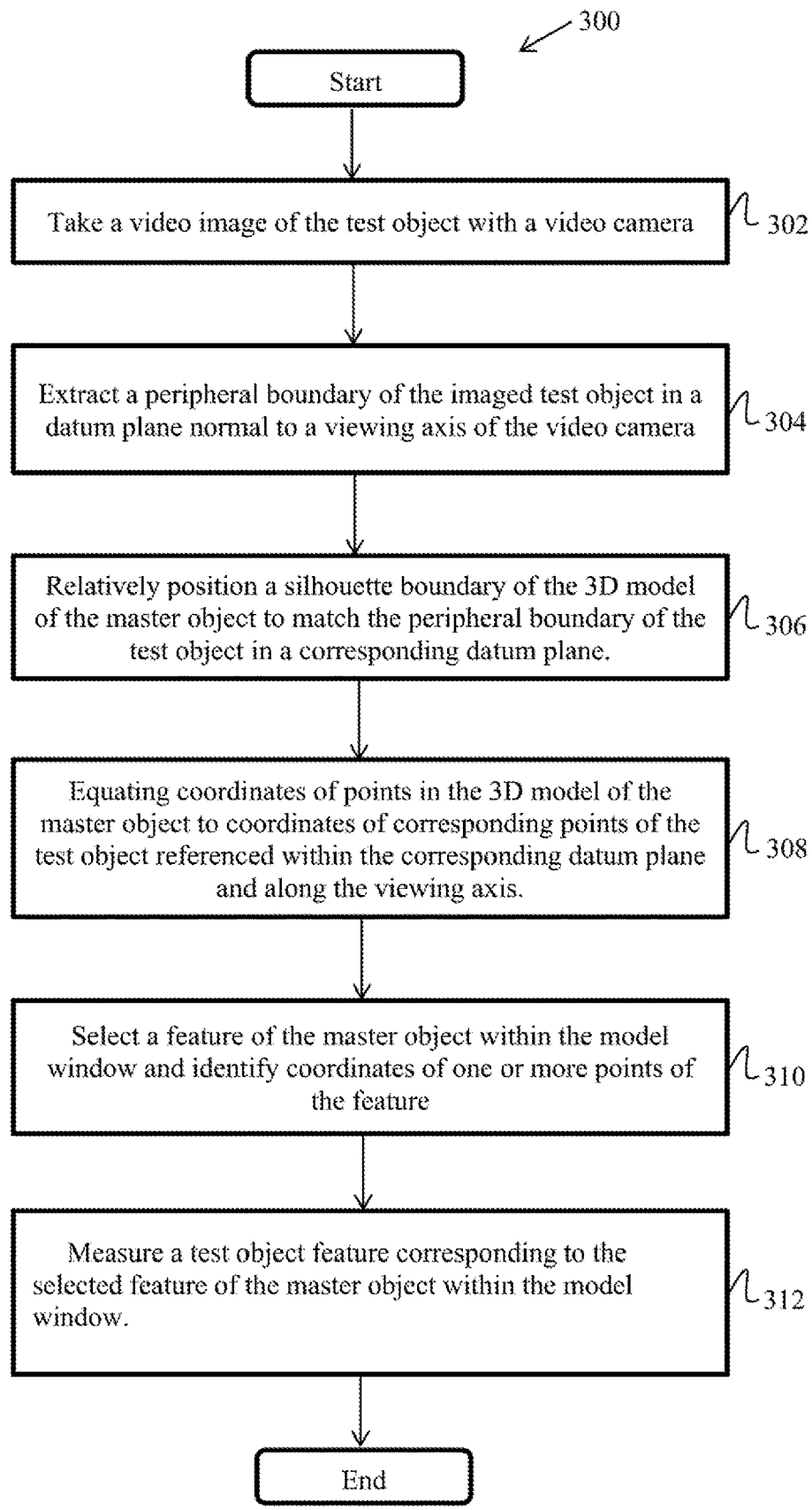
FIG. 3 is a flowchart disclosing the method steps of an embodiment for measuring different features of a test object with a machine vision system.

FIG. 3 shows another configuration of the invention showing a process for measuring different features of a test object 20 with a machine vision system 10 having reference to a 3D CAD model. The process 300 may begin with the step of the user taking a video image of the test object 20 with a video camera 90 according to step 302. The process 300 further includes extracting a peripheral boundary of the imaged test object 20 in a datum plane normal to a viewing axis of the video camera 90 via the peripheral boundary extractor 140 according to step 304. A silhouette boundary of a 3D CAD model is obtained by a silhouette boundary extractor 150 as described above. According to step 306, the silhouette boundary of the 3D CAD model is relatively positioned to match the peripheral boundary of the test object in a corresponding datum plane via matching module 170. As set forth in step 308, the coordinates of points in the 3D CAD model are matched to the coordinates of corresponding points of the test object referenced within the corresponding datum plane along the viewing axis via coordinate assignor 180. Thus, the user can select a feature of the CAD model within the model window of the display panel 70 and identify coordinates of one or more points of the feature to be measured according to step 310. As set forth in step 312, the feature of the test object 20 corresponding to the selected feature of the CAD model within the model window is then selected and the system 10 moves to measure the selected feature on the test object 20. Typically, a relatively large field of view (FOV) and a relatively large depth of field (DOF) is used so that the boundary of the part is in focus, including those features of the test part 20 not near the datum plane. For example, the low magnification optical path of the Fusion large field of view multisensor measurement system available at Quality Vision International, Inc. may be set to 100 mm FOV and 75 mm useable DOF. Once the boundary of the test part 20 is obtained using the low magnification optical path, the user may make feature measurements of the test part using the high magnification f/5 optical path of the Fusion large field of view multisensory measurement system. In an exemplary embodiment, the FOV and the DOF is automatically set.

If necessary, however, the focus of the video camera 90 may be changed with respect to the test object 20 based on the coordinates of the one or more points of the selected feature of the CAD model as referenced along the viewing axis. The lighting conditions of the test object may also be changed based on the coordinates of the points of the feature of the CAD model to be measured. For example, front surface illuminator, 190 or backlight 50 may be selected. It should be appreciated, however, that other illuminator positions may be used and selected to light the test object 20 to be measured.

The present invention contemplates that many changes and modifications may be made. Therefore, while the presently-preferred form of the system has been shown and described, and several modifications and alternatives discussed, persons skilled in the art will readily appreciate that various additional changes and modifications may be made without departing form the scope of the invention, as defined and differentiated by the following claims.

The invention claimed is:

1. A method of aligning a 3D CAD model to a test object in a machine vision system having coordinate axes including a viewing axis of a camera, comprising steps of:
   orienting the 3D CAD model in a model window of the machine vision system for exposing features of the CAD model that correspond to features of the test object intended for measurement;
   placing the test object on a stage of the machine vision system in an orientation approximately matching the orientation of the 3D CAD model;
   taking an image of the test object on a motion stage with the camera and extracting a peripheral boundary in a datum plane normal to the viewing axis of the camera;
   extracting a silhouette boundary of the 3D CAD model in a corresponding datum plane;
   relatively positioning the silhouette boundary of the 3D CAD model to match the peripheral boundary of the test object in the corresponding datum plane using a fitting algorithm; and
   matching coordinates of points in the 3D CAD model to coordinates of corresponding points of the test object referenced within the corresponding datum plane and along the viewing axis, wherein the step of extracting a silhouette boundary of the 3D CAD model in a corresponding datum plane further comprises the steps of:
   collecting all line segments from possible silhouette edges of a 3D triangle mesh of the CAD model;
   projecting the possible silhouette line segments in 2D using the view direction of the camera;
   generating 2D candidate contour points on the line segments;
   generating test points each moveable from a first position matching one of the candidate contour points to a second shifted position; and
   determining if each test point in the shifted position is covered by other surfaces of the 3D triangle mesh of the CAD model, wherein each 2D candidate contour point corresponding to the test points in a second shifted position not covered by any other surfaces is a true contour point.

2. The method of claim 1, further comprising the step of generating a minimum spanning tree having a set of edges on the test points covered by any other surface in the second shifted position.

3. The method of claim 2, further comprising the step of discarding a subset of edges of the minimum spanning tree that are longer than a point generation density, wherein a remaining subset of edges of the minimum spanning tree are segments of a true contour line of the 3D CAD model.

4. The method of claim 3, further comprising the step of using a fitting algorithm to fit the remaining subset of minimum spanning tree edges to the peripheral boundary of the test object.

5. The method of claim 1 in which the 3D CAD model includes lines connected by vertices and the step of extracting the silhouette boundary includes removing the lines that are interior to the boundary of the 3D CAD model in the corresponding datum plane.

6. The method of claim 1, further comprising the step of:
   selecting on the 3D CAD model a feature to be measured;
   automatically translating at least one of the stage and the camera to a desired position based on the matching coordinates of points in the 3D CAD model to coordinates of corresponding points of the test object referenced within the corresponding datum plane and along the viewing axis; and
   measuring a test object feature corresponding to the selected feature of the CAD model.

7. The method of claim 1, further comprising the step of:
   selecting on the 3D CAD model a feature to be measured; and
   automatically focusing the camera with respect to the test object based on the coordinates of the one or more points of the selected feature of the CAD model before measuring the selected feature on the test object.

8. The method of claim 1, wherein the step of taking an image of the test object on the motion stage with the camera includes the step of using a video camera to provide one of: (i) still image data; and (ii) image data of a frame from a video stream.

9. The method of claim 1, further comprising the step of backlighting the test object before taking the image of the test object on the motion stage with the camera.

10. The method of claim 1, further comprising the step of:
    selecting on the 3D CAD model a feature to be measured;
    automatically translating at least one of the motion stage and the camera to a desired position based on the matching coordinates of points in the 3D CAD model to coordinates of corresponding points of the test object referenced within the corresponding datum plane and along the viewing axis;
    automatically focusing the camera; and
    measuring a test object feature corresponding to the selected feature of the CAD model.

11. A method of measuring different features of a test object with a machine vision system having reference to a 3D CAD model, comprising steps of:
    orienting the 3D CAD model in a model window;
    taking a video image of the test object with a video camera;
    extracting a peripheral boundary of the imaged test object in a datum plane normal to a viewing axis of the video camera;
    relatively positioning a silhouette boundary of the 3D CAD model to match the peripheral boundary of the test object in a corresponding datum plane;
    matching coordinates of points in the 3D CAD model to coordinates of corresponding points of the test object referenced within the corresponding datum plane and along the viewing axis;

selecting a feature of the CAD model within the model window and identifying coordinates of one or more points of the feature; and measuring a test object feature corresponding to the selected feature of the CAD model within the model window.

12. The method of claim 11, further comprising the step of changing a focus of the video camera with respect to the test object based on the coordinates of the one or more points of the selected feature of the CAD model as referenced along the viewing axis before measuring the test object feature.

13. The method of claim 11, further comprising a step of changing lighting conditions of the test object based on the coordinates of the one or more points of the selected feature of the CAD model as referenced within the corresponding datum plane and along the viewing axis.

14. The method of claim 11, further comprising the step of adjusting a field of view (FOV) of the video camera to allow for the features of the test object to be measured to be within the field of view (FOV).

15. The method of claim 11, further comprising the step of adjusting a depth of field (DOF) of the video camera to allow for an entire peripheral boundary of the test object to remain in focus, whether or not the peripheral boundary is near the datum plane.

16. The method of claim 14, wherein the step of adjusting the field of view (FOV) of the video camera is automatic.

17. The method of claim 15, wherein the step of adjusting the depth of field (DOF) of the video camera is automatic.

* * * * *

UNITED STATES PATENT AND TRADEMARK OFFICE
CERTIFICATE OF CORRECTION

PATENT NO. : 10,579,890 B2
APPLICATION NO. : 15/890488
DATED : March 3, 2020
INVENTOR(S) : Edward T. Polidor and Attila Prokai Page 1 of 1

It is certified that error appears in the above-identified patent and that said Letters Patent is hereby corrected as shown below:

In the Specification

Column 2, Lines 5-6, after "test points" and before "covered by" insert --not--.

Column 9, Line 66, after "test points" and before "covered by" insert --not--.

Signed and Sealed this
Twenty-third Day of June, 2020

Andrei Iancu
*Director of the United States Patent and Trademark Office*